(12) United States Patent
Wennerberg

(10) Patent No.: US 9,818,209 B2
(45) Date of Patent: Nov. 14, 2017

(54) USER INTERFACE FOR RADAR LEVEL GAUGE ANALYSIS

(71) Applicant: Rosemount Tank Radar AB, Gothenburg (SE)

(72) Inventor: Tomas Wennerberg, Kallered (SE)

(73) Assignee: Rosemount Tank Radar AB, Gothenburg (SE)

( * ) Notice: Subject to any disclaimer, the term of this patent is extended or adjusted under 35 U.S.C. 154(b) by 420 days.

(21) Appl. No.: 14/677,144

(22) Filed: Apr. 2, 2015

(65) Prior Publication Data

US 2016/0292893 A1    Oct. 6, 2016

(51) Int. Cl.
| | |
|---|---|
| *G06T 11/20* | (2006.01) |
| *G06F 3/14* | (2006.01) |
| *G01F 23/284* | (2006.01) |
| *G01F 25/00* | (2006.01) |
| *G01S 13/88* | (2006.01) |
| *G01S 7/22* | (2006.01) |
| *G01S 7/40* | (2006.01) |

(52) U.S. Cl.
CPC ........ *G06T 11/206* (2013.01); *G01F 25/0076* (2013.01); *G01S 7/22* (2013.01); *G01S 7/40* (2013.01); *G01S 13/88* (2013.01); *G06F 3/14* (2013.01); *G01F 23/284* (2013.01); *G09G 2370/16* (2013.01)

(58) Field of Classification Search
None
See application file for complete search history.

(56) References Cited

U.S. PATENT DOCUMENTS

2012/0056774 A1* 3/2012 Wennerberg .......... G01F 23/284
                                                                342/124

OTHER PUBLICATIONS

Reference Manual, Rosemount 5300 Series Superior Performance Guided Wave Radar, Jan. 2015.

* cited by examiner

*Primary Examiner* — Michelle Chin
(74) *Attorney, Agent, or Firm* — Westman, Champlin & Koehler, P.A.

(57) ABSTRACT

A method for analyzing a level gauge, comprising storing in a storage device a consecutive sequence of data triplets including a time stamp, a filling level measurement, and an echo curve information, plotting a trend line including filling level as a function of time, graphically indicating a pointer in the trend line, displaying an echo curve corresponding to a point in time initially represented by the pointer, receiving user input indicating a set of points along a section of the trend line selected for analysis, and for each point in the set of points, moving the pointer to this point and replacing contents of the second graphical element, such that an echo curve displayed in the second graphical element always corresponds to a point in time represented by a current position of the pointer.
The invention enables a user to analyze operation of the level gauge during a time period corresponding to the selected trend line section.

25 Claims, 5 Drawing Sheets

USER INTERFACE FOR RADAR LEVEL GAUGE ANALYSIS

FIELD OF THE INVENTION

The present invention relates to a user interface for performing radar level gauge analysis.

BACKGROUND OF THE INVENTION

Echo based level gauges are configured to emit a signal and receive a reflection of said signal in a surface in a tank and to determine a filling level based on an echo curve resulting from said reflection. A well known example of such gauges is the radar level gauge (RLG).

Radar level gauges are widely used for measuring the filling level of products contained in tanks, such as oil, gasoline, natural gas. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. In some applications, one or several radar level gauges are mounted on tanks, typically very large tanks, and filling level data is communicated to a remote control unit by wire or wireless.

Conventionally, if a failure occurs such that one of the radar level gauges presents an erroneous filling level or is rendered completely inoperable, an operator will connect a mobile data storage (e.g. a laptop) to the failing radar level gauge in order to record data (echo curves etc.) during a period of time. If and when the failure occurs again, the recorded data may be analyzed and the reason for failure identified. Such procedure may also be implemented for analyzing how the gauge interacts with the rest of the process.

The Radar Master system by Rosemount is a software tool for such analysis of stored data. With this software, a user may use a slider to view a series of echo curves recorded over time.

Although the Radar Master software provides considerable advantages over other existing solutions, there is still a need to even further improve and facilitate the process of identifying a reason for failure in a radar level gauge and to better understand the general gauging process and how the gauge interacts with the rest of the process.

GENERAL DISCLOSURE OF THE INVENTION

It is an object of the present invention to at least mitigate the above mentioned problems, and to provide improved analysis of level gauge operation.

According to a first aspect of the invention, this and other objects are achieved by a method for analyzing a level gauge, which level gauge is configured to emit a signal and receive a reflection of said signal in a surface in a tank and to determine a filling level based on an echo curve resulting from said reflection. The method comprises:

during operation of the ranging device, storing in a storage device a consecutive sequence of data triplets, each triplet including:
1) a time stamp,
2) a filling level measurement, and
3) an echo curve information, in a first graphical element on a display device, plotting a trend line including filling level as a function of time, based on time stamps and associated filling level measurements acquired from the storage device graphically indicating, in the trend line, a pointer, acquiring, from the storage device, echo curve information corresponding to a point in time initially represented by the pointer, in a second graphical element on the display device, displaying an echo curve based on the acquired echo curve information, receiving user input indicating a set of points along a section of the trend line selected for analysis, for each point in the set of points, moving the pointer to this point and replacing contents of the second graphical element, such that an echo curve displayed in the second graphical element always corresponds to a point in time represented by a current position of the pointer, thereby enabling a user to analyze operation of the level gauge during a time period corresponding to the selected trend line section.

According to a second aspect of the invention, this and other objects are achieved by a graphical user interface (GUI) for a level gauge analysis system, which GUI is configured to perform the steps of:

in a first graphical element on a display device, plotting a trend line including filling level as a function of time, based on time stamps and associated filling level measurements acquired from a storage device graphically indicating, in the trend line on the display device, a pointer, acquiring, from the storage device, echo curve information corresponding to a point in time initially represented by the pointer in a second graphical element on the display device, displaying an echo curve based on the acquired echo curve information, receiving user input indicating a set of points along a section of the trend line selected for analysis, for each point in the set of points, moving the pointer to this point and replacing contents of the second graphical element, such that an echo curve displayed in the second graphical element always corresponds to a point in time represented by a current position of the pointer, thereby enabling a user to analyze operation of the level gauge during a time period corresponding to the selected trend line section.

A third aspect of the invention relates to a level gauging system comprising:
at least one level gauge,
a storage device for storing a consecutive sequence of data triplets, each triplet including:
1) a time stamp,
2) a filling level measurement, and
3) an echo curve,
and software for diagnosing the operation of the level gauge including a graphical user interface according to the second aspect of the invention.

According to these aspects of the present invention, an improved and continuous analysis method is made possible by continuous storage of data "triplets", each including a time stamp, a filling level, and an echo curve. The storage can be made within the local memory of the RLG during operation. The storage of data triplets enables a new and improved graphical user interface enabling a more effective method for performing analysis.

By recording data continuously, there will be recorded data available the first time a failure occurs. Further, the graphical presentation of a trend line enables a user to more easily identify when a failure has occurred, indicated e.g. by when the trend line 'flatlines', jumps suddenly, or a full or empty tank is abruptly indicated. A user can thus more easily identify a section in time where a potential failure occurred, and inspect the echo curves corresponding to such a sections. For example, the user may mark a portion of the trend line where e.g. the filling level has changed abruptly, and discover the cause for the faulty determination from observing the echo curve.

The functionally may also be used to configure the RLG during installation. By using the trend line and echo curve the user can quickly identify when the tank was empty and use the echo curve from that section of the trend line to set the threshold in order to eliminate or filter out unwanted echoes resulting from structures in the empty tank.

The expression 'time stamp' may refer to the time passed since the gauge was turned on. However, it may also be an actual time, if the gauge has a clock which has been set to actual time.

The expression 'echo curve information' should here be interpreted broadly, and refers generally to information enabling the system to visualize at least a schematic each curve. In some applications, it is a complete echo curve, including a set of sampled values. In other applications, the "echo curve" may be compressed, and may for example include only important peaks (i.e. only a very limited number of points along the curve). Adequate processing may then recreate a simplified version of the complete echo curve.

The expression 'filling level' may be any value representing filling level. However, it may also be other information enabling the system to determine the filling level. For example, it can be an identification of one of the peaks in the (possibly compressed) echo curve.

It is noted that the expression "acquired from the storage device" is intended to include direct access to the storage device, but also access via any intermediate storage device. The storage device may be provided as an integrated part of the level gauge, e.g. as an internal memory card. Alternatively, the storage device is separate from the level gauge, and only connected (physically or wirelessly) to the gauge during storage of the triplets.

Further, other types of data and diagnostic events can also be stored in order to be presented on the trend line or in the second graphical elements. For example, the temperature of electrical circuitry, or signal strength could also be stored and/or presented.

According to a preferred embodiment, the echo curve is displayed vertically with respect to the normal operating orientation of the display device, with an upper end of the curve representing a top of the tank, and a lower end of the curve representing a bottom of the tank.

The echo curve may include distances from a reference position in the top of the tank down to the bottom of the tank. However, the curve may also include "negative" distances, relating to positions upstream the reference. Such positions may correspond to echoes caused by internal reflections in the radar level gauge, including e.g. wave guide transitions. Further, the curve may include distances greater than the height of the tank, relating to "imaginary" positions below the bottom of the tank. Such positions may correspond to echoes below the surface of the product (e.g. caused by an second medium interface or by the bottom of the tank) which are perceived as further away due to the dielectric constant of the product.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
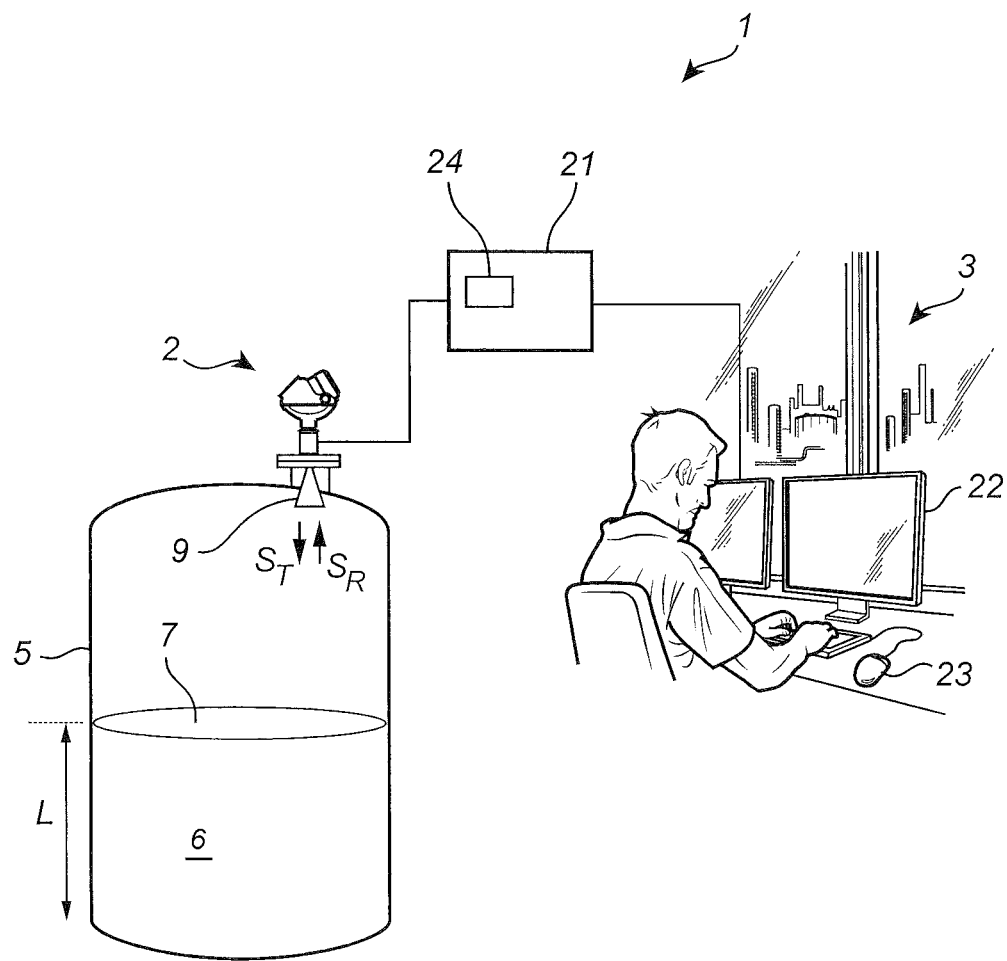
FIG. 1 schematically shows a radar level gauge mounted on a tank and in communication with a host system.

FIG. 1 schematically shows a level gauging system 1 based on the principle of detecting time of flight for a signal reflected by a surface in a tank 5. In the illustrated example, the signal is an electromagnetic signal in the radar frequency range, and the system 1 comprises a radar level gauge (RLG) 2 mounted on the tank 5. The level gauging system further comprises a host system 21 located e.g. in a control room 3. The tank 5 may be any container or vessel capable of containing a product to be measured, and is here illustrated as a large refinery tank (e.g. 30 m in diameter).

The radar level gauge 2 is installed to measure the filling level of a product 6 contained in the tank 5, by detecting the distance to an upper surface 7 of the product 6. Also a distance to a lower interface, such as an interface between an oil product and water below the oil, may be detected. In the illustrated example, the radar level gauge 2 is of non-contact type, and comprises a directional antenna 9 for emitting electromagnetic signals towards the surface 7.

As an alternative, the radar level gauge may be of guided wave radar (GWR) type, in which case the antenna 9 is replaced by some kind of transmission wave guide, e.g. a single conductor probe, extending into the product 6.

Figure 2:
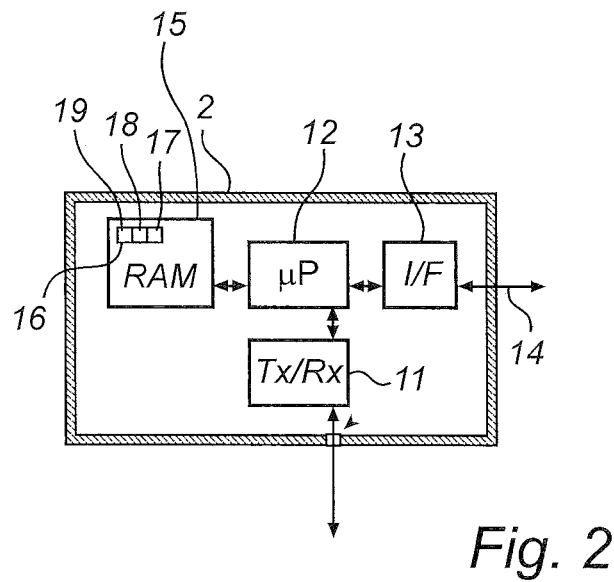
FIG. 2 shows a block diagram of some components of the radar level gauge in FIG. 1.

With reference to FIG. 2, the radar level gauge 2 comprises a transmitter 11 electrically connected to the antenna 9, and processing circuitry 12 electrically connected to the transceiver 11. The RLG 2 further comprises an internal memory 15. The "transceiver" may be one functional unit capable of transmitting and receiving electromagnetic signals, or may be a system comprising separate transmitter and receiver units. The elements of the transceiver 11 are typically implemented in hardware, and form part of an integrated unit normally referred to as a microwave unit. The processing circuitry may include a combination of analogue processing realized in hardware, and digital processing realized embodied by software modules stored in the memory 15 and executed by an embedded processor. The invention is not restricted to the particular realization, and any implementation found suitable to realize the herein described functionality may be contemplated.

The transceiver 11 is configured to generate and transmit electromagnetic transmit signals $S_T$ which are emitted by the antenna 9 towards the surface 7 of the product 6. The transmit signal is typically a frequency modulated continuous wave (FMCW) or a pulsed signal comprising a train of separated pulses. Also various combinations of such transmit signals are known in the art. Electromagnetic return signals $S_R$ are caused by a reflection in the surface 7, and are received by the antenna 9 and fed back to the transceiver 11. The processing circuitry 12 is configured to determine the distance between a reference position at the top of the tank and the surface 7 by analyzing the transmit signal $S_T$ and the return signal $S_R$. Various signal processing for this purpose is known in the art, and typically include generation of an "echo curve", representing the amplitude of an echo as a function of the distance from the reference position. This echo curve is then analyzed to identify the echo caused by the surface (normally a relatively strong echo) and to determine the distance to the surface as the location of the peak of this surface echo. Based on the determined distance to the surface, generally referred to as ullage, and known dimensions of the tank 5, the filling level can then be deduced.

The RLG 2 further comprises a communication interface 13 connected to the processing circuitry 12 and configured to allow communication with the host system 3 via communication/power supply lines 14. The communication between the radar level gauge 2 and the host system 3 can be an analog and/or digital communication channel over the lines 14. For instance, the communication channel may be a two-wire 4-20 mA loop and the filling level may be communicated by providing a certain current corresponding to the filling level on the two-wire 4-20 mA loop. Digital data may also be sent across such a 4-20 mA loop, e.g. using the HART protocol. Furthermore, purely digital communication protocols such as Modbus, Profibus or Foundation Fieldbus may be used. In case of wired communication, the same wires 14 may also be used to power the gauge. Alternatively, a separate power connection or internal power source may be provided.

The interface 13 may also include a user interface, in which case the gauge 2 has a display.

The communication of data may alternatively be wireless, and the radar level gauge 2 may then advantageously be configured according to the so-called Wireless HART communication protocol (IEC 62591). In that case, the radar level gauge system 1 typically includes an internal power source such as a battery. The internal power source may be solar powered.

In a typical level gauging system, the host system 21 in the control room 3 continually receives filling level data from all gauges in the system, and displays on a display device 22 visual indications of these filling levels, any overfill alarms reported from the gauges, and any other relevant information.

According to an embodiment of the present invention, the processing circuitry 12 is further configured to store, in the memory 15, at reoccurring points in time, data collected during operation of the RLG. The data comprises a plurality of data triplets 16, each including an echo curve information 17, a filling level 18 calculated from that particular echo curve information 17, and a point in time (time stamp) 19 when this particular echo curve 17 was acquired.

The reoccurring points in time may be scheduled in advance to occur at regular time intervals, or may be dynamic, for example occurring more frequently when the filling level is changing rapidly (i.e. during emptying or filling the tank).

The memory required for each triplet 16 will primarily depend on the resolution of the echo curve information 17. A complete echo curve, including all available samples from the radar level gauge, will require approximately 3 kB of memory (1500 samples). A very compressed echo curve, including only the points corresponding to identified peaks, will require approximately only 30 byte of memory.

The storage frequency, i.e. how often triplets 16 are stored, will determine the resolution of the analysis, and can also vary. The most extensive storage is to store a triplet for each measurement cycle (sweep) of the radar level gauge, i.e. typically one every second. However, once every minute will normally be sufficient for analysis purposes, and even storage once every ten minutes may provide valuable information. A combination of different storage frequencies is also possible, for example it may be advantageous to store triplets once a minute, and to then delete some of those triplets which are older than a given period, e.g. one hour. For example, nine of ten triplets may be deleted, leaving one triplet per ten minutes.

In a typical implementation, the storage capacity of the memory 15 is limited to 128 kB. If compressed echo curves are stored once a minute, this would correspond roughly to 48 hours of storage.

Of course, the memory 15 can be replaced by a higher capacity memory. However, in case of a standard 4-20 mA two-wire connection, the bandwidth of the digital data transmission superposed on the analogue communication is very restricted, in the case of HART communication only 2 kB/s. Therefore, if remote access over the communication lines 14 is desired, extensive storage may not be useful.

Instead, if more extensive storage (i.e. more complete echo curves, more frequent storage, or storage during a longer period of time, or a combination of these) than what the internal memory can provide is required, the interface 13 may be configured to enable connection of an external memory, for example a USB memory stick, or a lap top. After the monitoring period is complete, the memory can simple be disconnected, and analysis of the data can be performed elsewhere.

Figure 3:
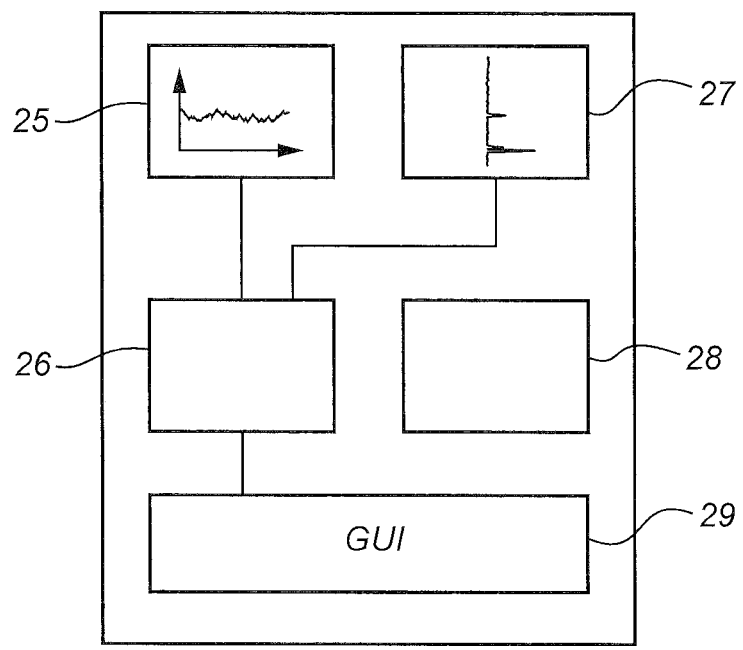
FIG. 3 is a block diagram of a level gauge analysis software according to an embodiment of the present invention.

Turning now to FIG. 3, an analysis software 24 for analysis of the stored data is illustrated. This software 24 is configured to retrieve and analyze the triplets 16, stored in a manner described above. In the illustrated example, the software 24 is part of the host system 21 and is configured to access the data stored in the local memory 15 of the gauge, either wirelessly or over the communication lines 14. The data is typically completely downloaded to the host system 21 for analysis. Alternatively, the software 24 may dynamically access the data during the analysis.

In another embodiment, the software 24 is provided on a separate processing unit, for example a portable unit such as a laptop, tablet, or mobile phone, which is brought to close vicinity of the gauge 2. Such a processing unit may be connected directly to the gauge 2 (with or without a wire) and may access the memory 15. Alternatively, and as was mentioned above, mobile processing device may be connected to the gauge 2 and serve as the memory 15' in which triplets are stored during operation of the gauge. According to yet another embodiment, the software 24 is provided internally in the gauge, and the graphical user interface 29 described below can then be displayed on a display of the gauge.

Figure 4:
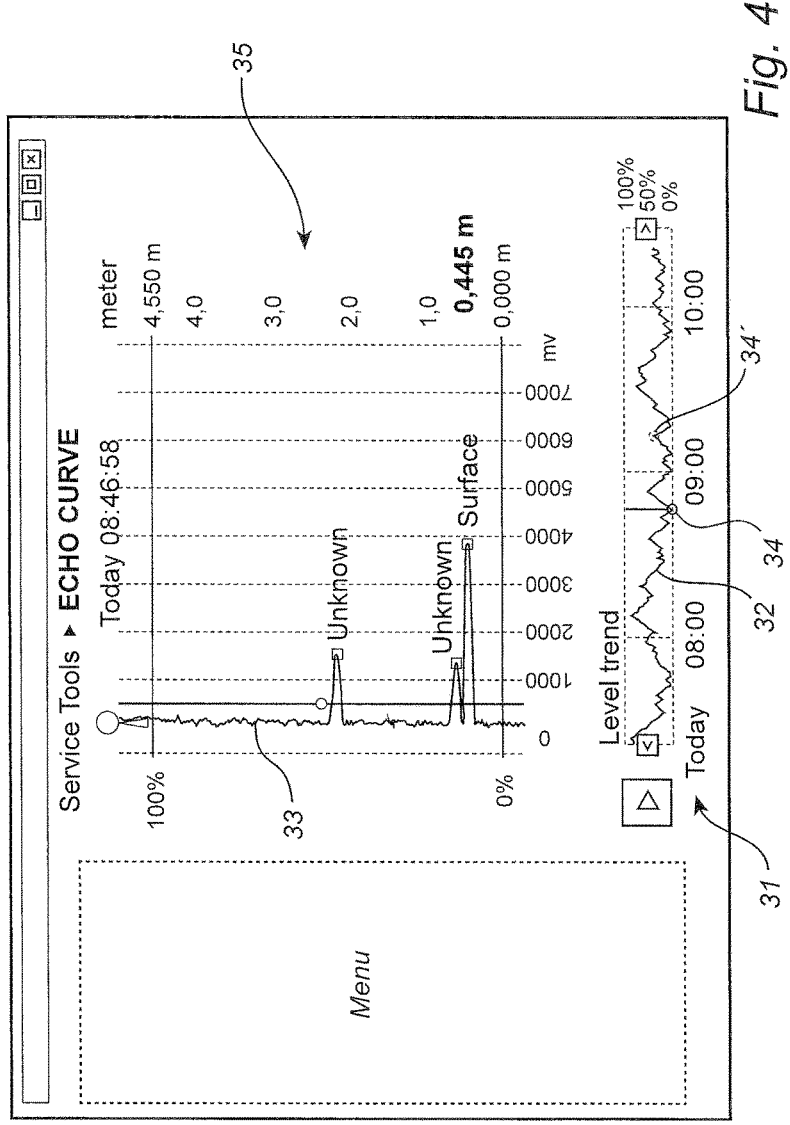
FIG. 4 is a screen shot from the graphical user interface of the software in FIG. 3.

As illustrated in FIG. 3, the software 24 includes a trend line generation block 25, a graphic generation block 26, an echo curve selection block 27, a user input block 28 and a graphical user interface (GUI) 29. A screen shot of the GUI 29 is shown in FIG. 4.

Figure 5:
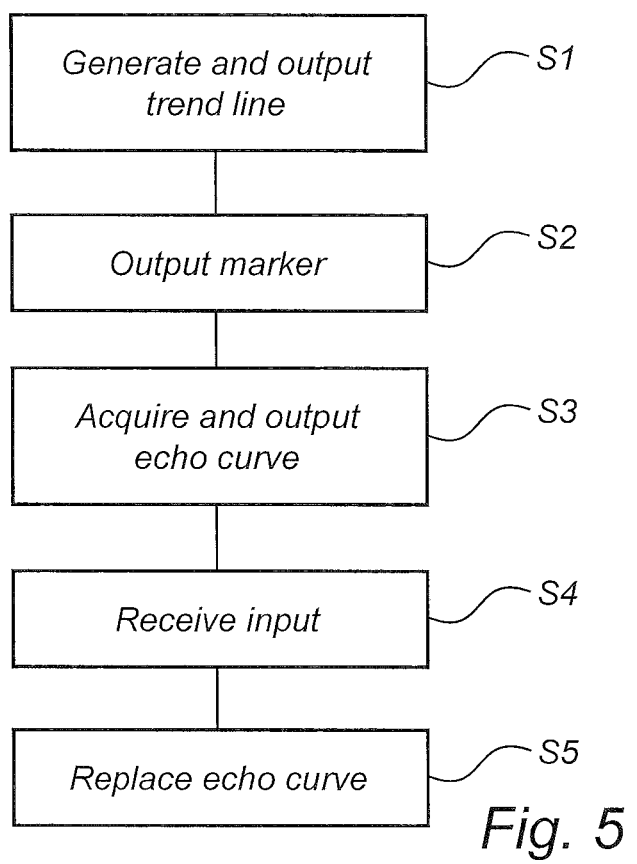
FIG. 5 is a flow chart of a method according to an embodiment of the present invention.

With reference now to the flow chart in FIG. 5, the operation of the software 24 will be described. First, in step S1, the trend line generation block 25 accesses the data stored in memory 15 (possibly intermediately stored in control system 21), and uses a set of time stamps 19 and associated filling levels 18 in the data triplets 16 to generate a trend line 32 indicating filling level as function of time. The graphic generation block 26 visualizes this trend line 32 on the display device 22 in a first graphical element 31 of the user interface 29 (FIG. 4). In step S2, the graphic generation block 26 further outputs a pointer 34 indicating an initial point in time along the trend line 32.

In step S3, the echo curve selection block 27 accesses the stored data (data triplets 16) to retrieve echo curve information 17 associated with the point in time represented by the pointer 34. The graphic generation block 26 visualizes this echo curve information 17 on the display device 22 as an echo curve 33 in a second graphical element 35 of the user interface 31. The echo curve 33 is here illustrated along a vertical axis, to better resemble an actual tank.

If the echo curve information 17 includes all the samples of a complete echo curve, the graphics generation block 26 can simply plot these samples in a graph. However, if the echo curve information 17 is compressed, additional processing may be required. For example, the information 17 may include only a small set of points associated with identified peaks. The echo curve 33 may then be schematically visualized, e.g. as only indicating these peaks. Suitable interpolation between samples may also be used to create a visual image of a complete echo curve.

In step S4, the user input block 28 receives input from the user, typically via a mouse 23 or similar pointing device, which input indicates a new position of the pointer 34 along the trend line 32. The new position is communicated to the graphic generation block 26 to immediately visualize a movement of the pointer 34, indicated in FIG. 4 by dashed pointer 34'.

In step S5, the new position is communicated to the echo curve selection block 27. The echo selection block 27 determines the point in time corresponding to the new position of the pointer 34', and selects an echo curve data 17 corresponding to this point in time. The graphics generation block 26 then modifies the second graphical element 35 to display the selected echo curve data as an echo curve.

Steps S4 and S5 are continually repeated during the analysis, allowing the user to analyze in detail a section of the trend line by selecting a set of points along the trend line. The points can be selected by simply moving the pointer along this section of the trend line 32. In one embodiment, this interaction is achieved by clicking on the pointer 34 and "dragging" it along the trend line with the pointing device button depressed. Another option is to provide a "play"-button, which initiates an automatic advancement of the pointer 34 from a given starting point until interrupted by the user, Yet another alternative is to allow the user to mark a section of the trend line, and to then automatically advance the pointer 34 along this section. During such movement of the pointer 34, the echo curve 33 in the second graphical element 35 is continuously replaced with an echo curve corresponding to a point in time represented by a current position of the pointer. Hereby, the user can investigate the behavior of the echo curve which has resulted in the "suspicious" section of the trend line 32, and draw conclusions about the operation of the level gauge during a time period corresponding to the selected trend line section. Such analysis can be prompted by a failure in the gauge i.e. a clearly or suspected erroneous filling level indication, or a complete loss of filling level. There may also be other reasons to investigate a section of the trend line, related to the overall process that is being gauged.

Figure 6:
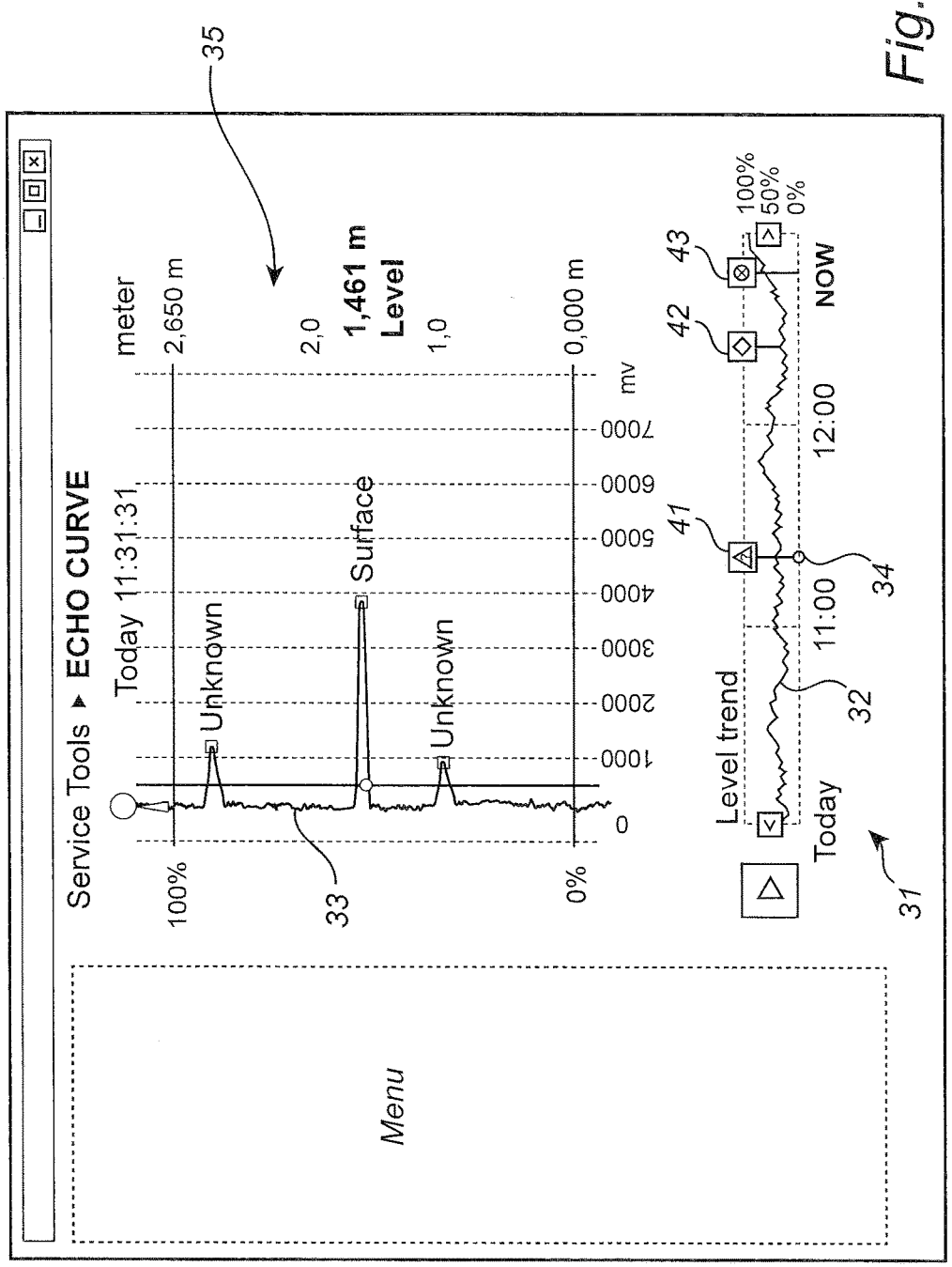
FIG. 6 is a screen shot from an alternative embodiment of the graphical user interface of the software in FIG. 3.

FIG. 6 shows a screen shot of an enhanced version of the GUI, where the trend line 32 has been provided with additional information in the form of indicators 41, 42, 43. These indicators represent various additional pieces of information potentially relevant for the analysis of the operation of the RLG. For example, the indicators may relate to predefined events in the form of alarms or alerts, such as electronics failure, a signal quality below a given threshold, or an electronics temperature above a given threshold. Also additional predefined events, within the normal operation of the gauge may be relevant, such as "power up". Such indicators may assist a user in identifying a section of the trend line which should be analyzed in more detail.

According to a further embodiment, the processing circuitry 12 is configured to store triplets 16 each time an alert such as those mentioned above occurs. Such storage may be in addition to the scheduled storage described above. Such storage will ensure that the GUI 29 can provide a user with an echo curve 33 for the exact time that a specific alert or alarm occurred.

An alternative way to provide information about conditions in the gauge is to continuously store information which can be displayed in connection to the trend line. As an example, each triplet 16 may include also a measure of the signal strength. These measures may then be used by the trend line generation block 25 to generate a signal strength trend line, which can be plotted by the graphic generation block 26 next to, e.g. along, the filling level trend line 32.

The person skilled in the art realizes that the present invention by no means is limited to the preferred embodiments described above. On the contrary, many modifications and variations are possible within the scope of the appended claims. For example, the trend line may display filling volume instead of filing level, by configuring the software 24 to perform a simple conversion.

What is claimed is:

1. A method for analyzing a level gauge, said level gauge being configured to emit a signal and receive a reflection of said signal in a surface in a tank and to determine a filling level based on an echo curve resulting from said reflection, the method comprising:
   during operation of said ranging device, storing in a storage device a consecutive sequence of data triplets, each triplet including:
   1) a time stamp,
   2) a filling level measurement, and
   3) an echo curve information,
   in a first graphical element on a display device, plotting a trend line including filling level as a function of time, based on time stamps and associated filling level measurements acquired from said storage device,
   graphically indicating, in said trend line, a pointer,
   acquiring, from said storage device, echo curve information corresponding to a point in time initially represented by said pointer,
   in a second graphical element on said display device, displaying an echo curve based on said acquired echo curve information,
   receiving user input indicating a set of points along a section of said trend line selected for analysis, for each point in said set of points, moving said pointer to this point and replacing contents of said second graphical element, such that an echo curve displayed in said second graphical element always corresponds to a point in time represented by a current position of said pointer, thereby enabling a user to analyze operation of said level gauge during a time period corresponding to said selected trend line section.

2. The method according to claim 1, further comprising displaying at least one additional indicator along said trend line, said indicator representing additional information related to predefined events occurring in the level gauge.

3. The method according to claim 1, further comprising storing a data triplet each time a predefined event occurs in the level gauge.

4. The method according to claim 1, wherein said echo curve is displayed vertically with respect to a normal operating condition of the display device, with an upper end of the curve representing a top of the tank, and a lower end of the curve representing a bottom of the tank.

5. The method according to claim 1, wherein said echo curve information includes a set of points associated with identified peaks, and wherein said echo curve is schematically displayed by indicating these peaks.

6. The method according to claim 1, wherein said storage device is provided in said level gauge.

7. The method according to claim 1, wherein said storage device is separate from said level gauge, and connected to the level gauge during storage of the triplets.

8. The method according to claim 1, wherein said display device is provided as part of a host system which is remote with respect to said level gauge, and wherein said method further comprises communicating said data triplets to said host system.

9. The method according to claim 8, wherein said host system is a portable processing device.

10. The method according to claim 9, wherein said storage device is provided in said portable processing device.

11. The method according to claim 8, wherein said host system is arranged to communicate wirelessly with the level gauge.

12. The method according to claim 8, wherein said host system is arranged to communicate with the level gauge by means of a wire connection.

13. The method according to claim 1, wherein said display device is integrated in said level gauge.

14. The method according to claim 1, wherein the level gauge is a radar level gauge and the emitted signals are electromagnetic signals.

15. A graphical user interface (GUI) for a level gauge analysis system, said GUI configured to perform the steps of:
in a first graphical element on a display device, plotting a trend line including filling level as a function of time, based on time stamps and associated filling level measurements acquired from a storage device
graphically indicating, in said trend line on said display device, a pointer,
acquiring, from said storage device, echo curve information corresponding to a point in time initially represented by said pointer
in a second graphical element on said display device, displaying an echo curve based on said acquired echo curve information,
receiving user input indicating a set of points along a section of said trend line selected for analysis,
for each point in said set of points, moving said pointer to this point and replacing contents of said second graphical element, such that an echo curve displayed in said second graphical element always corresponds to a point in time represented by a current position of said pointer, thereby enabling a user to analyze operation of said level gauge during a time period corresponding to said selected trend line section.

16. A level gauging system comprising: at least one level gauge,
a storage device for storing a consecutive sequence of data triplets,
each triplet including:
1) a time stamp,
2) a filling level measurement, and
3) an echo curve information,
software for diagnosing the operation of the level gauge including a graphical user interface according to claim 15.

17. The system according to claim 15, wherein said storage device is provided in said level gauge.

18. The system according to claim 15, wherein said storage device is separate from said level gauge, and connected to the level gauge during storage of the triplets.

19. The system according to claim 18, wherein said host system is a portable processing device.

20. The system according to claim 15, wherein said display device is provided as part of a host system which is remote with respect to said level gauge, and wherein said method further comprises communicating said data triplets to said host system.

21. The system according to claim 20, wherein said storage device is provided in said portable processing device.

22. The system according to claim 18, wherein said host system is arranged to communicate wirelessly with the level gauge.

23. The system according to claim 18, wherein said host system is arranged to communicate with the level gauge by means of a wire connection.

24. The system according to claim 15, wherein said display device is integrated in said level gauge.

25. The system according to claim 15, wherein the level gauge is a radar level gauge, and the emitted signals are electromagnetic signals.

* * * * *